United States Patent
Coraggio et al.

(10) Patent No.: US 9,462,755 B1
(45) Date of Patent: Oct. 11, 2016

(54) MODULAR WALL ASSEMBLY FOR PROMOTING VERTICAL VEGETATIVE GROWTH

(71) Applicants: Michael Coraggio, Flemington, NJ (US); Ryan Burrows, Flemington, NJ (US)

(72) Inventors: Michael Coraggio, Flemington, NJ (US); Ryan Burrows, Flemington, NJ (US)

(73) Assignee: EcoWalls, LLC, Bordentown, NJ (US)

( * ) Notice: Subject to any disclaimer, the term of this patent is extended or adjusted under 35 U.S.C. 154(b) by 297 days.

(21) Appl. No.: 13/773,714

(22) Filed: Feb. 22, 2013

Related U.S. Application Data

(60) Provisional application No. 61/601,958, filed on Feb. 22, 2012.

(51) Int. Cl.
| | | |
|---|---|---|
| *A01G 25/00* | (2006.01) | |
| *A01G 9/02* | (2006.01) | |
| *A01G 27/04* | (2006.01) | |

(52) U.S. Cl.
CPC ............... *A01G 9/025* (2013.01); *A01G 27/04* (2013.01)

(58) Field of Classification Search
CPC ........... A01G 9/02; A01G 9/128; E04B 1/00
USPC ....... 47/59 R, 60, 65.8, 66.6, 81, 82, 83, 86; 52/745.09
See application file for complete search history.

(56) References Cited

U.S. PATENT DOCUMENTS

| | | | |
|---|---|---|---|
| 2,279,735 A * | 4/1942 | Gates | 47/33 |
| 5,287,650 A * | 2/1994 | Moriguchi et al. | 47/59 R |
| 5,617,673 A | 4/1997 | Takashima | |
| 5,650,450 A | 7/1997 | Lovette et al. | |
| 6,178,690 B1 * | 1/2001 | Yoshida et al. | 47/65.9 |
| 6,634,138 B2 | 10/2003 | Katzman | |
| 6,727,091 B2 | 4/2004 | Darlington | |
| 7,243,460 B2 | 7/2007 | Darlington | |
| 7,716,873 B2 | 5/2010 | Irwin | |
| 7,832,144 B2 | 11/2010 | Corradi | |
| 7,921,599 B2 | 4/2011 | Irwin | |
| 8,578,651 B1 * | 11/2013 | Giacomantonio | A01G 31/02 47/59 R |
| 2004/0063194 A1 | 4/2004 | Darlington et al. | |
| 2005/0055879 A1 * | 3/2005 | Darlington | 47/62 R |
| 2008/0110086 A1 | 5/2008 | Julia | |
| 2010/0095586 A1 * | 4/2010 | Sichello | 47/65.9 |
| 2011/0036010 A1 | 2/2011 | Silverberg | |
| 2013/0025199 A1 * | 1/2013 | Perroulaz | A01G 9/025 47/86 |

* cited by examiner

*Primary Examiner* — Rob Swiatek
*Assistant Examiner* — Ebony Evans
(74) *Attorney, Agent, or Firm* — Joseph E. Maenner; Maenner & Associates, LLC

(57) ABSTRACT

A modular wall assembly for growing and promoting vegetative growth is disclosed. The assembly includes a frame and a growth media disposed within the frame. The growth media includes a wicking matrix, a first nutrient transfer matrix, a second nutrient transfer matrix, and a planting matrix. A modular wall system including a plurality of the modular wall assemblies is also disclosed.

17 Claims, 16 Drawing Sheets

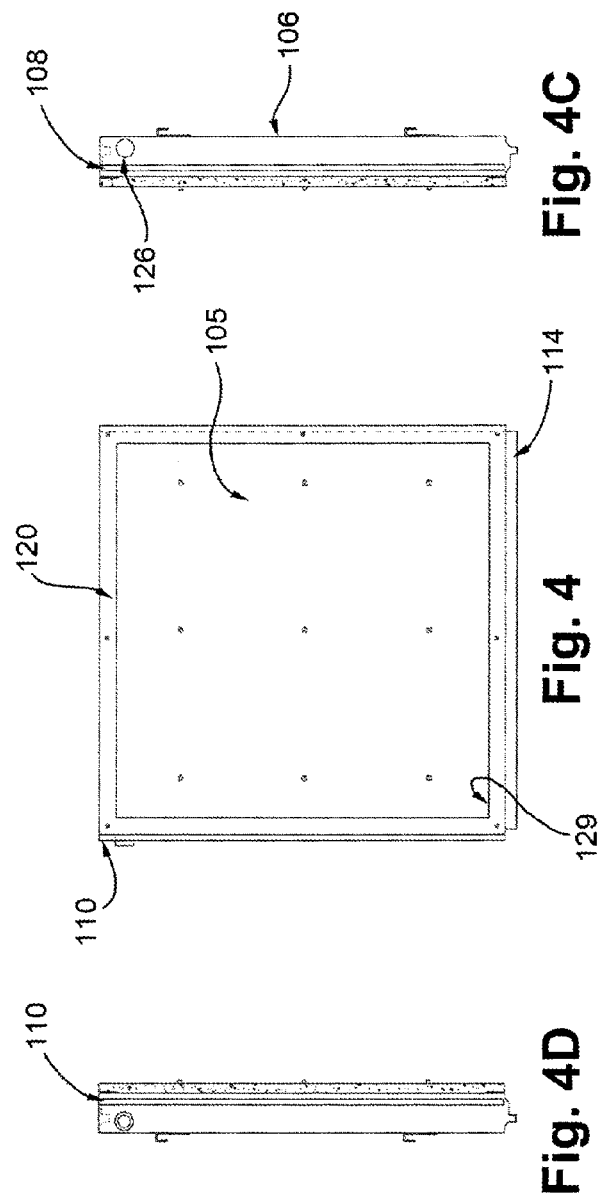

MODULAR WALL ASSEMBLY FOR PROMOTING VERTICAL VEGETATIVE GROWTH

CROSS-REFERENCE TO RELATED APPLICATIONS

This application claims priority from U.S. Provisional Patent Application Ser. No. 61/601,958, filed on Feb. 22, 2012, which is incorporated herein by reference in its entirety.

FIELD OF THE INVENTION

The present invention relates to a living vertical wall garden that supports and sustains plant life inserted therein.

BACKGROUND OF THE INVENTION

Vertical wall gardens have recently become a popular architectural and aesthetic design feature throughout the building community. In addition to providing numerous and different types of plants in a small footprint, these gardens are also used to help purify interior building air and improve water quality. One problem with many current vertical wall gardens, however, is that the matrix in which vegetation is planted may dry out, and does not adequately re-wet, resulting in inadequate liquid transfer from the matrix to the vegetation and poor vegetation health. Consequently, many of the current hydroponic systems need to run water frequently through the matrix, leading to a surplus of wastewater and nutrients. Conversely, soil-based wall gardens are difficult to monitor water retention, often becoming too wet during early phase plantings and root-bound before the wall can reach maturity.

It would be beneficial to develop a vertical wall garden that can retain and provide water to plant roots to maintain the health of the plants and reduce the amount of water and resources required to sustain healthy plant growth.

BRIEF SUMMARY OF THE INVENTION

Briefly, the present invention provides a modular wall assembly for growing and promoting vegetative growth. The assembly comprises a frame and a growth media disposed within the frame. The growth media comprises a wicking matrix, a first nutrient transfer matrix, a second nutrient transfer matrix, and a planting matrix.

Further, the present invention provides a modular wall assembly for growing and promoting vegetative growth. The assembly comprises a generally parallelepiped frame having a rear wall and a growth media releasably installed in the frame. The growth media comprises, from the rear wall forward: an inorganic wicking matrix, a first nutrient transfer matrix, a second nutrient transfer matrix, and an inorganic planting matrix.

Additionally, the present invention provides a modular wall system comprising a first modular wall assembly comprising a first growing media and a first frame having a top portion. The top portion has a generally horizontal groove formed therein. A second modular wall assembly comprises a second growing media and a second frame having a top portion having a horizontal fluid conduit extending therethrough and a bottom portion having a generally horizontal tongue formed therein. The horizontal tongue is adapted to be inserted into the horizontal groove in the first modular wall assembly such that fluid flowing from the horizontal fluid conduit through the second modular wall assembly is directed by the horizontal tongue into the first modular wall assembly.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 4 is a front elevational view of an exemplary wall frame for use with the living vertical garden assembly of FIG. 1;

FIG. 4A is a top plan view of the wall frame of FIG. 4;

FIG. 4B is a bottom plan view of the wall frame of FIG. 4;

FIG. 4C is a right side elevational view of the wall frame of FIG. 4;

FIG. 4D is a left side elevational view of the wall frame of FIG. 4;

DETAILED DESCRIPTION OF THE INVENTION

Figure 1:
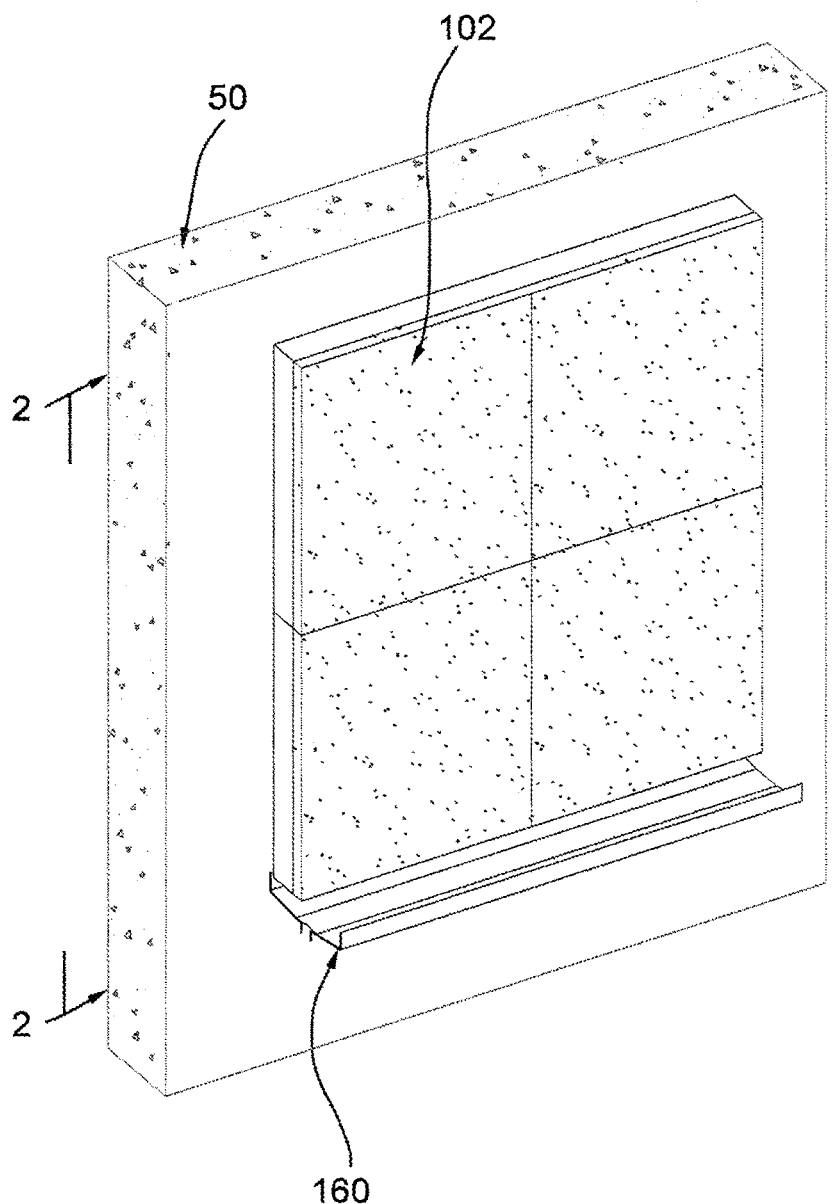
FIG. 1 is a perspective view of a living vertical wall garden assembly according to a first exemplary embodiment of the present invention.

In the drawings, like numerals indicate like elements throughout. Certain terminology is used herein for convenience only and is not to be taken as a limitation on the present invention. The terms "front" and "rear" refer, respectively, to a location proximal to a viewer when the inventive device is in its mounted, operational position and a location distal from the viewer when the inventive device is in its mounted, operational position. Additionally, the terms "top" and "bottom" refer, respectively, to a higher vertical location when the inventive device is in its mounted, operational position and to a lower vertical location when the inventive device is in its mounted, operational position. The terms "left" and "right" refer, respectively, to directions when viewing the inventive device from the front when the inventive device in its mounted, operational position. The term "adjacent" refers to the location of one inventive wall frame relative to another inventive wall frame wherein the two inventive wall frames physically engage each other. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Referring to FIGS. 1-9, a living vertical garden assembly 100 according to a first exemplary embodiment of the present invention is shown. As shown in FIG. 1, a living vertical garden assembly 100 is a generally vertical wall into which plant life is inserted and subsequently grown hydroponically. Living vertical garden assembly 100 includes an irrigation system (shown in FIG. 5) mounted at least partially inside living vertical garden assembly 100 that provides water and other nutrients for the growth of the plants mounted in living vertical garden assembly 100. Living vertical garden assembly 100 may be planted and moved to a desired location for installation. Alternatively, living vertical garden assembly 100 may be assembled on site.

Figure 2:
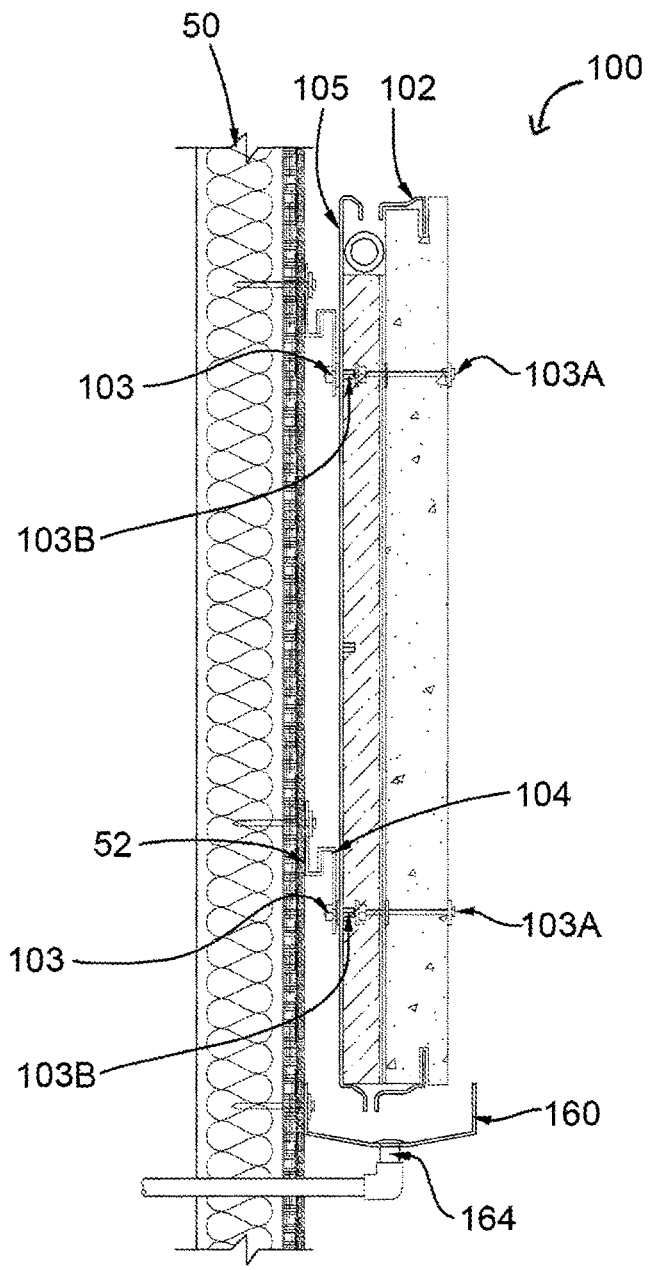
FIG. 2 is side elevational view of the living vertical garden assembly of FIG. 1, taken along lines 2-2 of FIG. 1.
Figure 3:
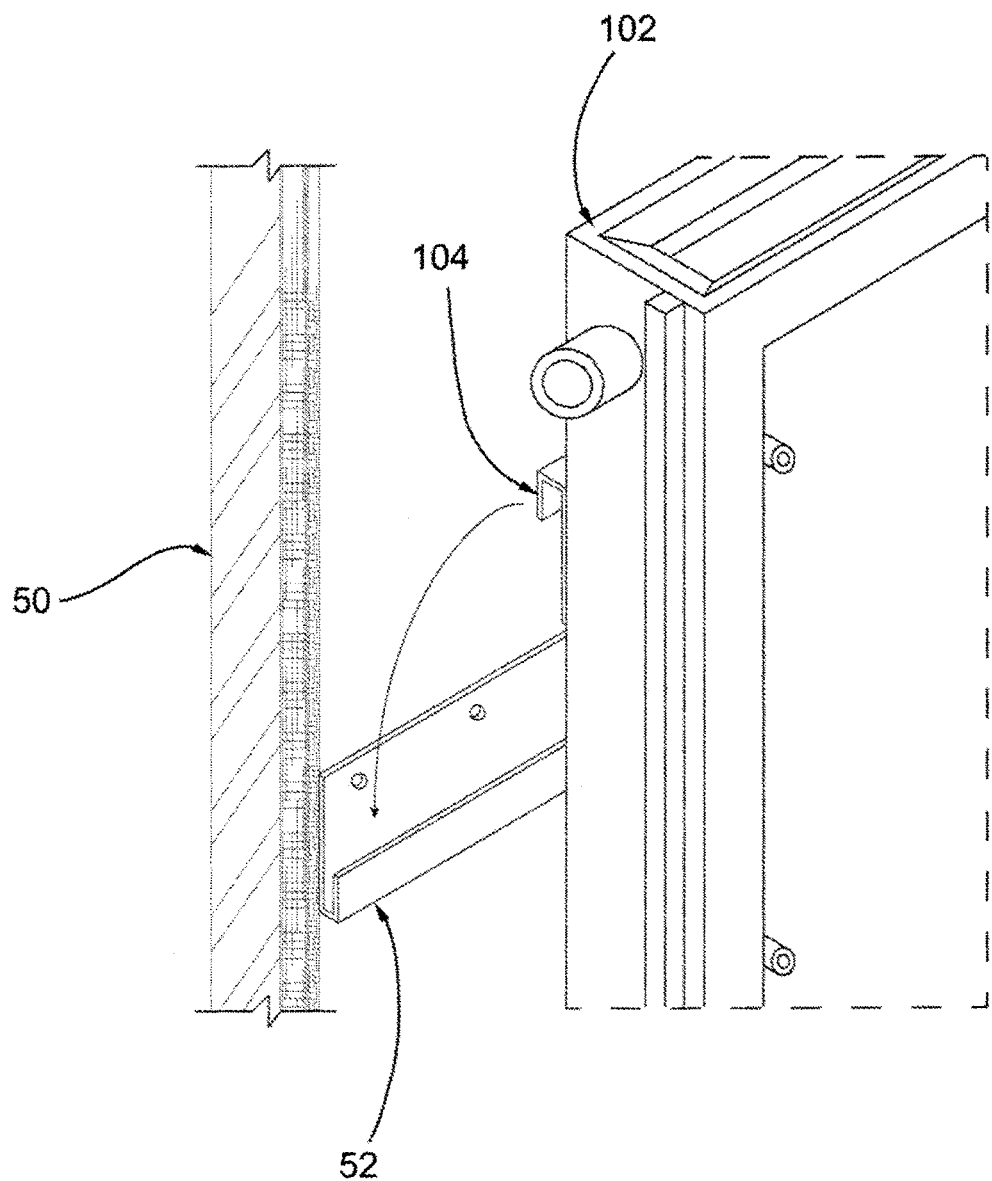
FIG. 3 is a perspective view of an inventive living vertical garden assembly being releasably coupled to a vertical support structure

Referring to FIGS. 2 and 3, living vertical garden assembly 100 may be a modular system in which a plurality of wall frames 102 are connected together. Each wall frame 102 may be independently and removably mounted on a support frame 50, such as, for example, a wall or some other vertical frame. Support frame 50 can include a bottom portion 52 of a J-channel hook assembly while wall frame 102 includes a top portion 104 of the J-channel hook assembly such that wall frame 102 can be placed against wall 50 such that top portion 102 of the J-channel hook assembly is above the bottom portion 52 of the J-channel hook assembly and lowered by gravity so that top portion 104 of the J-channel hook assembly engages bottom portion 52 of the J-channel hook assembly, thereby releasably securing wall frame 102 to support frame 50. Optionally, support frame 50 may be mounted on wheels (not shown) so that living vertical garden assembly 100 can be wheeled to a desired display location. As shown FIG. 2, two sets of J-channel hook assemblies 52, 104 can be used.

Wall frame 102 includes a back panel 105 to which top portion 104 of the J-channel hook assembly may be attached. This attachment may be with standard nuts and washers 103A and bolts 103, although care must be taken to waterproof any openings in back panel 105 through which any bolts 103 or other attachment mechanism may extend. This waterproofing may be in the form of TEFLON® Tape encasing the threaded bolt 103. The threaded bolt 103 will pass through a threaded insert 103B, which is embedded into the back panel 105. Because bolts 103 extend through planting media, it is desired that bolts 103 be stainless steel or galvanized to prevent rusting.

Referring to FIGS. 4 and 4A-D, wall frame 102 is rectangular in shape and, in an exemplary embodiment, generally square or parallelepiped in shape, with horizontal and vertical dimensions of about 1 meter (about 3 feet) in each dimension. Wall frame 102 incorporates tongue and groove connections to releasably secure adjacent wall frames 102, 102' 102", shown in FIG. 5, to each other. In an exemplary embodiment, wall frames 102, 102', and 102" may be identical to each other, but are provided with different element numbers in this description to differentiate physically different wall frames.

Figure 6:
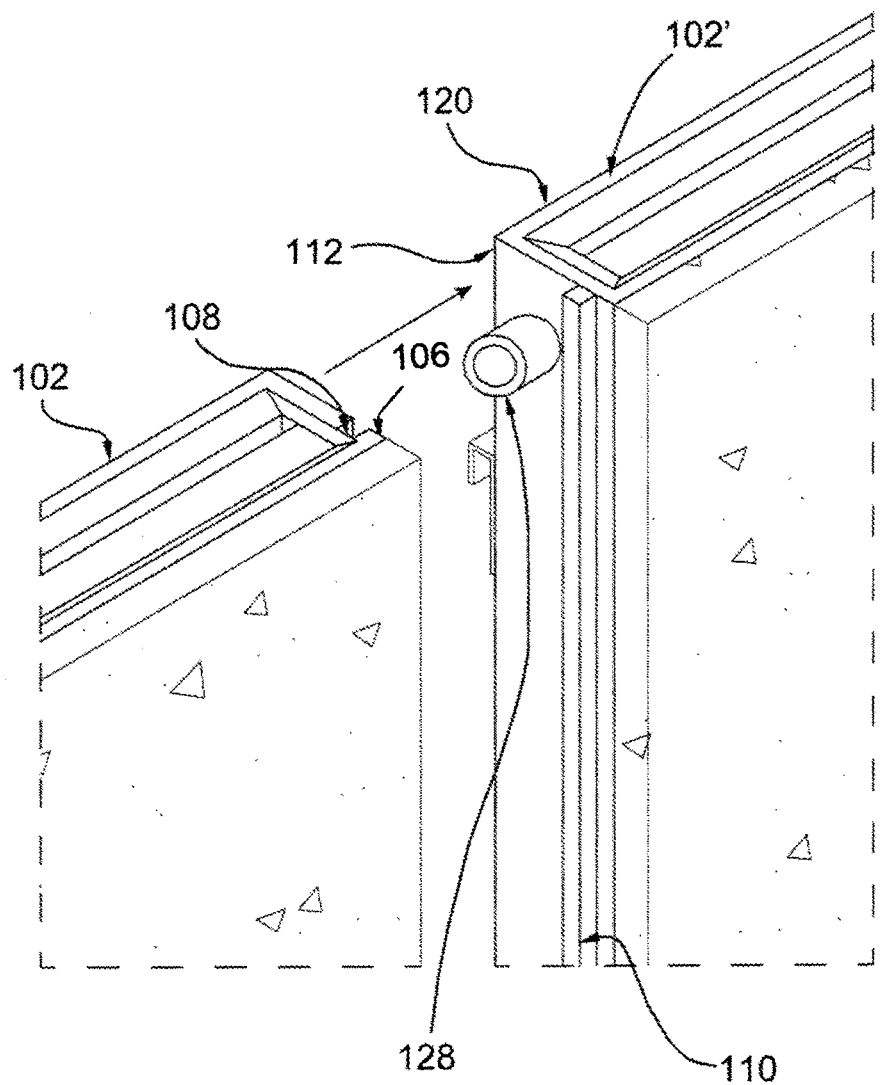
FIG. 6 is an enlarged perspective view illustrating a connection between a first living vertical garden assembly and a horizontally adjacent living vertical garden assembly.

In an exemplary embodiment, shown in FIG. 6, right side 106 of wall frame 102 includes a groove 108 that fits into a tongue 110 in left side 112 of wall frame 102'. Left side 106 of wall frame 102' and right side 112 of wall frame 102 are both generally solid so that no fluids can freely pass between wall frame 102 and wall frame 102'.

Figure 7:
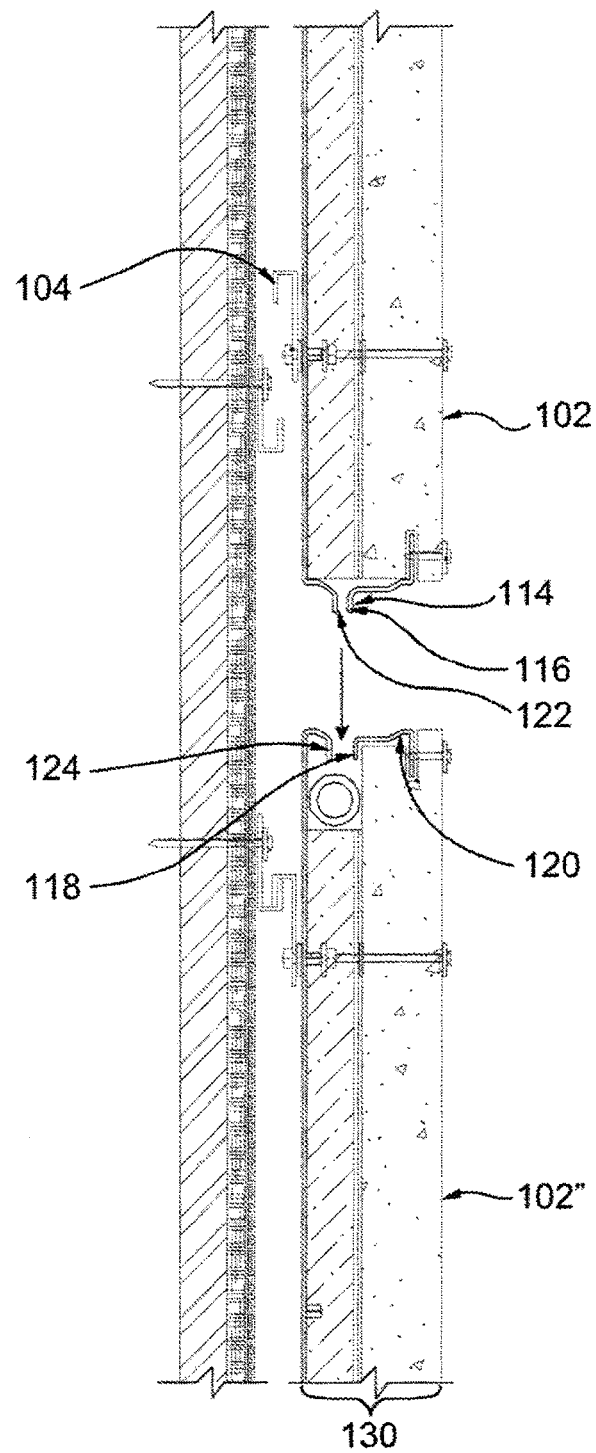
FIG. 7 is an enlarged perspective view illustrating a connection between the first living vertical garden assembly and a vertically adjacent living vertical garden assembly.

Referring to FIG. 7, the bottom 114 of wall frame 102 includes a tongue 116 that fits into a groove 118 in the top 120 of wall frame 102". Tongue 116 includes an opening 122 that extends generally across the bottom of tongue 116 and groove 118 also includes an opening 124 that extends generally across the top of groove 118 so that fluids, such as water, can flow downward from wall frame 102, through openings 122 and 124, and into wall frame 102", but such that the fluids cannot flow out between wall frame 102 and wall frame 102".

The horizontal tongue and groove arrangement in wall frames 102 and 102" allows for free liquid transfer between vertically adjacent wall frames 102 and 102" and does not require support frame 50 to be waterproofed. This feature provides the benefit of not having to waterproof a wall in a building (unless required by local building codes) if living vertical garden assembly 100 is hung on a wall.

Referring back to FIG. 4, a generally cylindrical opening 126 is formed in right side 106 of wall frame 102, proximate to top 120 of wall frame 102 and to the rear of groove 108. As shown FIG. 6, a generally tubular conduit 128 is formed in left side 112 of wall frame 102, proximate to top 120 of wall frame 102, to the rear of tongue 110, and along a common horizontal axis as cylindrical opening 126. The outer perimeter of conduit 128 is smaller than the perimeter of circular opening 126 so that, when wall frame 102 and wall frame 102' are inserted adjacent to each other, conduit 128 fits into and through circular opening 126. Opening 126 and conduit 128 are used to allow irrigation conduits to extend therethrough and into wall frame 102, as will be discussed in greater detail later herein. Each of left side 112, right side 106, bottom 114, and top 120 of wall frame 102 includes a lip extending in a common front plane so that the lips together form a border 129 around the perimeter of wall frame 102.

Wall frame 102 may be manufactured by spin molding recycled low-density polyethylene (LDPE) plastic. Those skilled in the art, however, will recognize that other manufacturing methods and materials may also be used to manufacture wall frame 102. For example, aluminum, stainless steel, other non-corrosive metals, durable plastics, or other suitable materials may be used to form wall frame 102. Such materials provide for easy replacement without removing structure or irrigation components.

Figure 8:
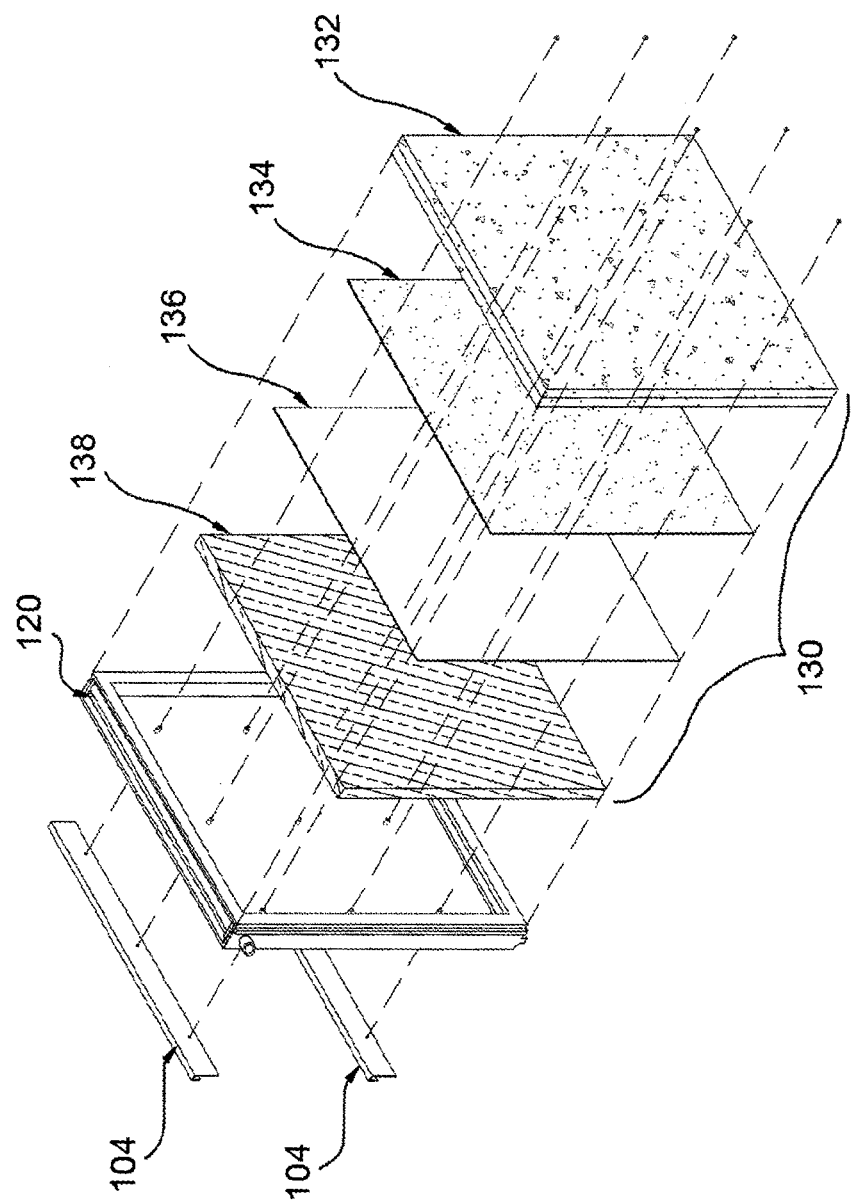
FIG. 8 is an exploded view showing layers of matrix material in the living vertical garden assembly of FIG. 1.

As shown in FIG. 8, a growth medium assembly 130 is inserted into wall frame 102 and against back panel 105. Growth medium assembly 130 includes a plurality of layers extending, from rear, adjacent to back panel 105, to front of wall frame 102, an inorganic wicking matrix 132, a first nutrient transfer matrix 134, a second nutrient transfer matrix 136, and an inorganic planting matrix 138. The nutrient transfer matrices 134, 136 include a plurality of layers, with the most outward and most inward layer being porous foam, with middle layers being fabric made from recycled PET and dense needle punched felt.

Growth medium assembly 130 allows for free root migration over entire wall assembly 100 so as not to limit root growth to small sections within wall assembly 100. Additionally, growth medium assembly 130 absorbs nutrients and water, reducing resource use for sustained healthy plant growth. Additionally, inorganic planting matrix 138 is porous, allowing oxygen exchange over the root mass, restricting bacteria and fungal growth while retaining water and oxygen.

Inorganic wicking matrix 132, first nutrient transfer matrix 134, and second nutrient transfer matrix 136 are inserted into wall frame 102 between back panel 105 and border 129 and are fastened to wall frame 102 via washers, nuts, and bolts (not shown). A rear portion of inorganic planting matrix 138 extends between back panel 105 and border 129, and a front portion of inorganic planting matrix 138 extends outward of wall frame 102 in front of border 129, so that inorganic planting matrix 138 obscures border 129 from view when viewing wall frame 102 from the front.

Inorganic wicking matrix 132 is a hydrophilic foam material constructed from polyurethane that has a density of between about 15 kg/m$^3$ and about 25 kg/m$^3$. Additionally, inorganic wicking matrix 132 has a tensile strength of about 5 lbs./in$^2$ and about 10 lbs./in$^2$ and a compressive force deflection (CFD) of between about 0.35 and about 0.50. Wicking matrix 132 is sufficiently porous to allow plant roots to extend into and through wicking matrix 132 so that the plant roots can absorb water and nutrients held by inorganic wicking matrix 132. First nutrient transfer matrix 134 and second nutrient transfer matrix 136 are each a hydrophilic felt material that is used to hold plant material in place and also to assist in distribution of water and nutrient the plant material horizontally via capillary action and vertically via capillary action and gravity. First nutrient transfer matrix 134 and second nutrient transfer matrix 136 are each constructed from a synthetic needle felt material. Each of first nutrient transfer matrix 134 and second nutrient transfer matrix 136 has a thickness of about 1 cm (about ⅜ inch).

In an exemplary embodiment, first nutrient transfer matrix 134 has holes punched therethrough approximately every 10 cm on center to allow for root migration into inorganic wicking matrix 132. In an exemplary embodiment, the holes have diameters between about 1 cm at about 2 cm. First nutrient transfer matrix 134 may be thicker then second nutrient transfer matrix 136. Both first nutrient transfer matrix 134 and second nutrient transfer matrix 136 are sufficiently porous to allow plant roots to extend into and through first nutrient transfer matrix 134 and second nutrient transfer matrix 136 so that the plant roots can absorb water and nutrients held by first nutrient transfer matrix 134 and second nutrient transfer matrix 136.

Inorganic planting matrix 138 is an open cell foam material that is used to structurally hold plant material in place in living vertical garden assembly 100. Horizontal slits (not shown) can be cut through inorganic planting matrix 138 and second nutrient transfer matrix 136, such as for example, with the utility knife, to allow the roots of the plant material to be inserted between second nutrient transfer matrix 136 and first nutrient transfer matrix 134. The horizontal slits can be any desired size. Typically, each horizontal slit may be between about 10 centimeters (about 4 inches) and about 20 centimeters (about 8 inches) long. Inorganic planting matrix 138 is sufficiently strong to support the planting of plants from pots as large as about 15 cm in diameter.

Inorganic planting matrix 138 may be secured to wall frame 102 via threaded bolts 103 that are used to secure top portion 104 of 3-channel assembly to back panel 105. Threaded bolt 103 maybe stainless steel machine screws that are used in conjunction with washers and hex nuts (not shown) to secure in inorganic planting matrix 138 to wall frame 102.

Figure 9:
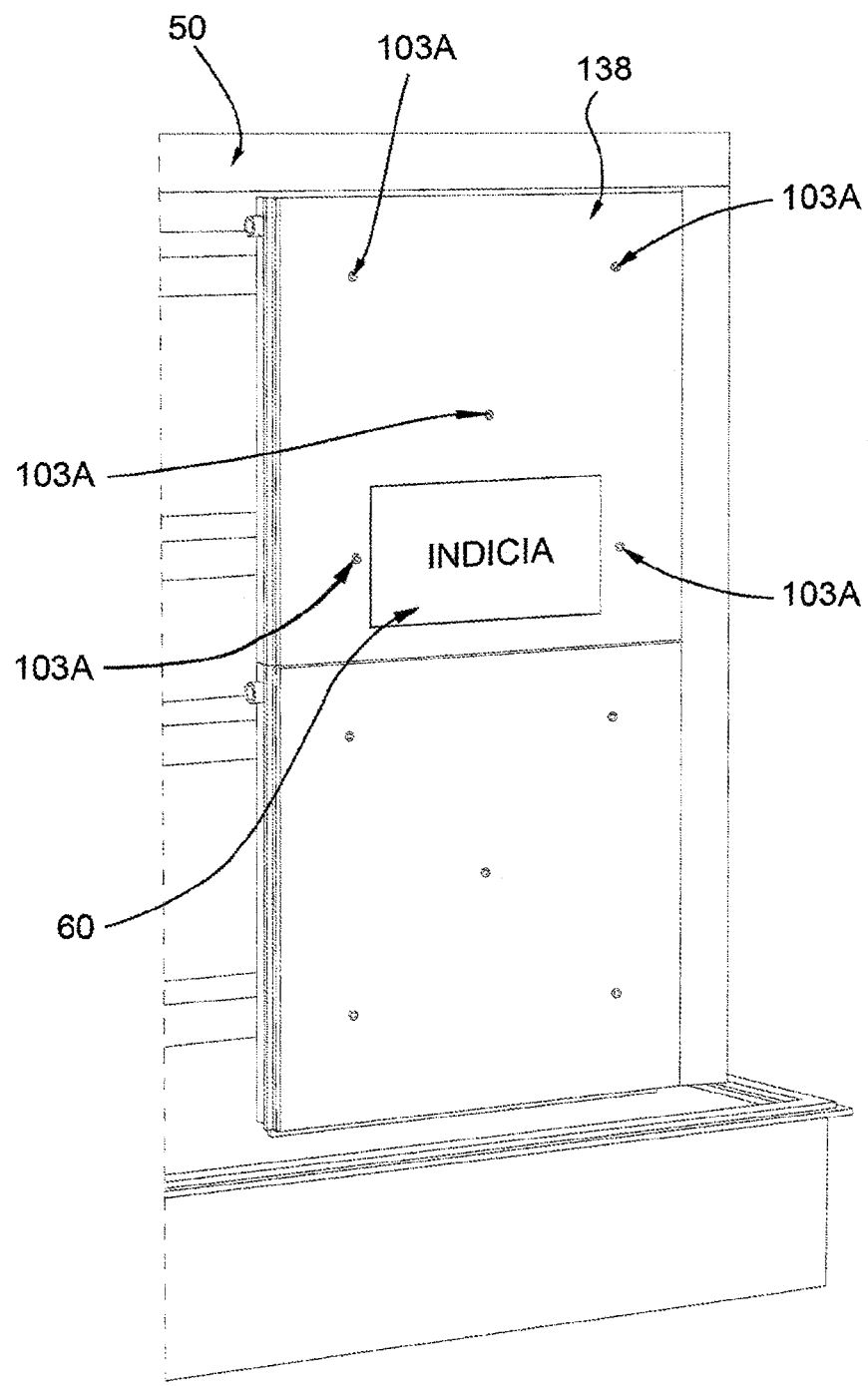
FIG. 9 is a perspective view showing a sign mounted on the matrix material of FIG. 8.

Threaded bolt 103 extend through inorganic planting matrix 138, second nutrient transfer matrix 136, first nutrient transfer matrix 134, and wicking matrix 132, as well as back panel 105. In an exemplary embodiment, as shown in FIG. 9, five (5) threaded bolt 103 are shown being distributed around living vertical garden assembly 100, although additional threaded bolts (not shown) may extend through only second nutrient transfer matrix 136, first nutrient transfer matrix 134, wicking matrix 132, and back panel 105.

In the event that a relatively large plant is being inserted into living vertical garden assembly 100, additional threaded inserts or stainless steel screws (not shown) can be added through inorganic planting matrix 138, second nutrient transfer matrix 136, and into first nutrient transfer matrix 134. Alternatively/additionally, as shown in FIG. 9, signage 60 can be fastened to living vertical garden assembly 100 to advertise or provide information about living vertical garden assembly 100. Such signage 60 can be fastened to living vertical garden assembly 100 by additional threaded bolts or screws (not shown) to back panel 105 or to wall frame 102. The thickness of first transfer matrix 134 is sufficient that the threads of the additional threaded bolts or screws can bite into the material of first transfer matrix 134 such that first transfer matrix 134 securely retains the threaded inserts therein.

A benefit of the materials used to form the layers of inorganic planting matrix 130 is that the materials do not affect the pH of the irrigation fluid, as may an alternative material, such as, for example rock wool. Further, this quality is more desirable in the event that living vertical garden assembly 100 is integrated with aquatic wildlife, such as in a water reservoir or pool located below living vertical garden assembly 100 and into which excess irrigation fluids drain. Additionally, some or all of the layers of inorganic planting matrix 130 can be removed from back panel 105 without removing back panel 105. For example, in an exemplary embodiment, only inorganic planting matrix 138 and second transfer matrix 136 need be removed. Nuts 103A and washers (not shown) are removed, the old inorganic planting matrix 130 is removed, then new inorganic planting matrix 130 is placed against back panel 105 and secured to back panel 105. This feature allows the removal and replacement of organic matter, such as plants, while living vertical garden assembly 100 is in place and eliminates the need to remove living vertical garden assembly 100 from its display location in order to remove and replace organic matter. Those skilled in the art however, will recognize that living vertical garden assembly 100 may be removed from its display location in order to remove and replace organic matter.

An added benefit of the materials used for the layers of inorganic planting matrix 130 is that in the event the material dries out, the material may be re-wet by applying additional water. Such a feature may not be applicable to other materials, such as rock wool or some foam material.

Referring back to FIG. 5, in order to provide water and nutrients to the plant roots, living vertical garden assembly 100 includes an irrigation distribution system 150. Irrigation distribution system 150 includes a vertical supply conduit 152 that extends upward along one side of living vertical garden assembly 100. Vertical supply conduit 152 is adapted to be in fluid communication with a pressurized water source (not shown). In an exemplary embodiment, vertical supply conduit 152 extends along the one side (left side or right side) of living vertical garden assembly 100. At least one horizontal irrigation fluid distribution conduit 154 is in fluid communication with vertical supply conduit 152. In an exemplary embodiment, if a plurality of horizontal irrigation distribution conduits 154 are used, each horizontal irrigation distribution conduit 154 has its own dedicated vertical supply conduit 152. In an alternative exemplary embodiment, a single vertical supply conduit 152 may be in fluid communication with the plurality of horizontal irrigation distribution conduits 154. Further, depending upon the size and height of living vertical garden assembly 100, multiple horizontal irrigation distribution conduits 154 can be dedicated to a single vertical supply conduit 152.

In an exemplary embodiment, vertical supply conduit 152 and horizontal irrigation distribution conduit 154 may both be manufactured from PVC pipe or other suitable material such as, for example tubing made from polyethylene. Vertical supply conduit 152 may have a nominal diameter of between about 16 mm (about ⅝ inch) and about 19 mm (about ¾ inch), while horizontal irrigation distribution conduit 154 may have a nominal diameter of about 16 mm (about ⅝ inch).

Horizontal irrigation distribution conduit 154 extends through tubular conduit 128 and into wall panel 102. Horizontal irrigation distribution conduit 154 extends between rear wall 105 and inorganic planting matrix 138. Horizontal irrigation distribution conduit 154 extends across the top of wall panel 102 and, if a second wall panel 102' is horizontally adjacent to and to the right of wall panel 102, exits through opening 126 (shown in FIG. 4) and into wall panel 102'. At the rightmost wall panel (in this case, wall panel 102'), the end of horizontal irrigation distribution conduit 154 is capped.

A plurality of flexible drip tubes 156 extend generally vertically downward from horizontal irrigation distribution conduit 154 between first nutrient transfer matrix 134 and second nutrient transfer matrix 136 to saturate both first nutrient transfer matrix 134 and second nutrient transfer matrix 136. In an exemplary embodiment, drip tubes 156 extend downward perpendicularly a short distance from distribution conduit 154 and are then woven horizontally into the top of first transfer matrix 134 to stabilize drip tubes 156 before dropping drip tubes 156 vertically. While drip tubes 156 are run generally vertically, those skilled in the art will recognize that drip tubes 156 may also be oriented with at least a partial horizontal run, depending on the types, numbers, and sizes of plant material that are planted in living vertical garden assembly 100. The arrangement of drip tubes 156 allows for the removal and replacement of inorganic planting matrix 138 and second nutrient transfer matrix 136 without disturbing drip tubes 156. In an exemplary embodiment, drip tubes 156 are spaced about 15 cm apart from each other along horizontal irrigation distribution conduit 154. Optionally, drip tubes 156 may extend only through wall panel 102 or, alternatively, if additional irrigation is required for plants that are planted in wall panel 102", at least one of drip tubes 156 may extend through opening 122 in tongue 116 along bottom 114 of wall frame 102, through opening 124 in groove 118 along top 120 of wall frame 102" and into wall frame 102".

Figure 5:
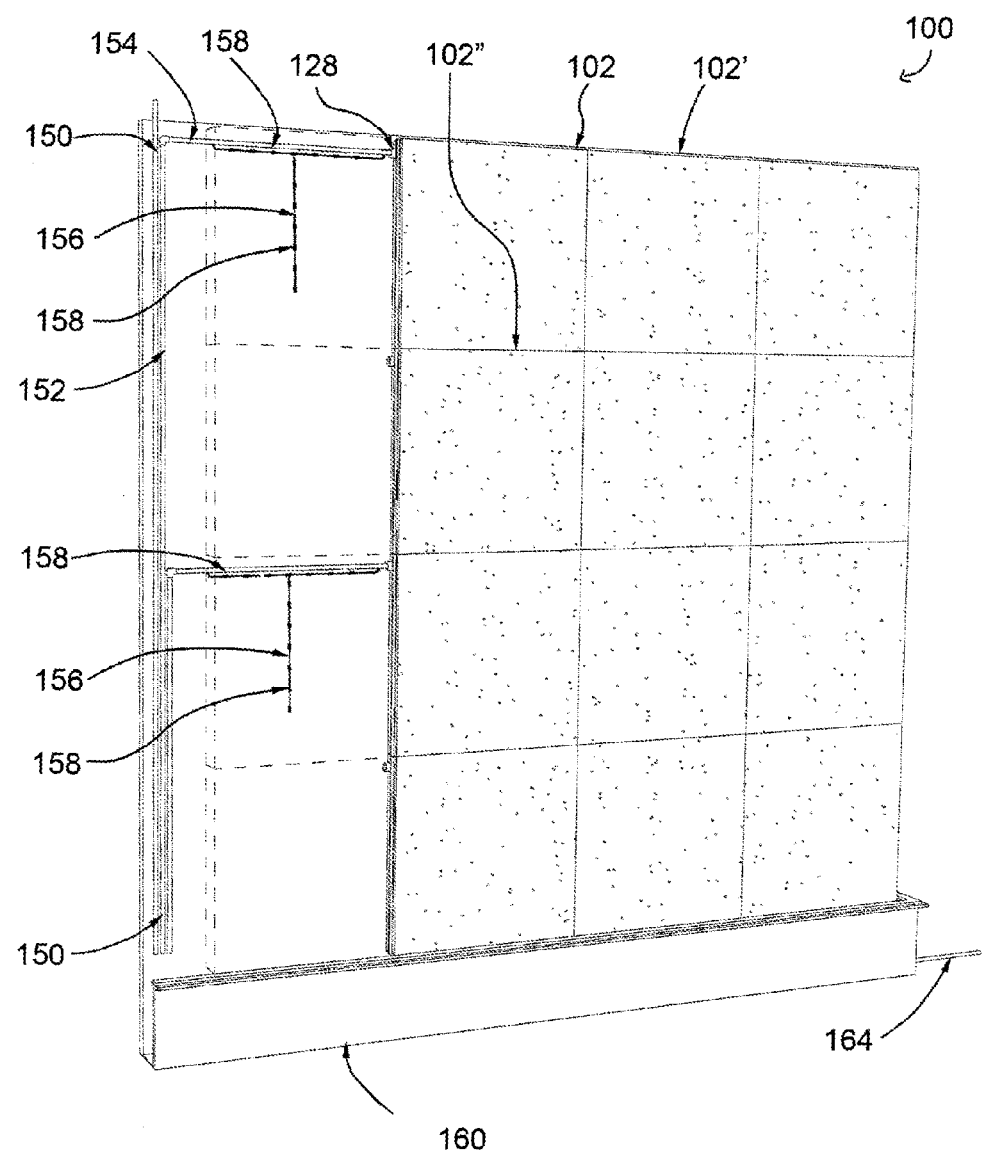
FIG. 5 is a perspective view illustrating an exemplary irrigation supply system for use with the living vertical garden assembly of FIG. 2.

As shown in FIG. 5, pressure compensation emitters 158 may extend along various locations along each drip tube 156 as well as through horizontal irrigation distribution conduit 154. In an exemplary embodiment, horizontal irrigation distribution conduit 154 may include six pressure compensation emitters 158 as well as to drip tubes 156, with each drip tube 156 having about five pressure compensation emitters 158.

Pressure compensation emitters 158 discharge irrigation fluid from drip tube 156 and/or horizontal irrigation distribution conduit 154, to first nutrient transfer matrix 134 and second nutrient transfer matrix 136, and subsequently to the roots of the plants in living vertical garden assembly 100. Pressure compensation emitters 158 may be sized for different flow rates, depending on the number, size, and types of plant material that are located proximate to each respective pressure compensation emitter 158. In an exemplary embodiment, 0.5 GPH pressure compensation emitters 158 are used, implementing a variable step flow, meaning that a larger number of pressure compensation emitters 158 are used closer to the top of living vertical garden assembly 100 (such as in horizontal irrigation distribution conduit 154), and a lesser number of pressure compensation emitters 158 are used in toward the bottom of living vertical garden assembly 100. In an exemplary embodiment, six pressure compensation emitters 158 may be used along a wall panel 102, while only three pressure compensation emitters 158 may be used on a wall panel 102". Those skilled in the art will recognize, however, that these numbers may vary by installation configuration, height, and environmental exposure of bio wall assembly 100.

For the exemplary embodiment of bio wall assembly 100, an optional drip channel 160 extends along the lowest wall frame (as shown in FIG. 2, below wall frame 102"). Drip channel 160 catches any irrigation fluid not absorbed by inorganic planting matrix 130 or by the plant roots. Drip channel 160 includes a drain line 164 that allows the irrigation fluid captured by drip channel 160 to drain out of drip channel 160 and to a drain (not shown).

Bio wall assembly 100 may also include a pressurized water system (not shown) in fluid communication with vertical supply conduit 152. The pressurized water system may include a nutrient supply (not shown) that is in fluid communication with irrigation fluid prior to entering vertical supply conduit 152, such that nutrients are mixed with the irrigation fluid for eventual discharge through drip emitters 158.

The pressurized water system may be configured to operate on a continual or a periodic basis, depending on the types of material being used in living vertical garden assembly 100, the ambient atmospheric conditions surrounding living vertical garden assembly 100, and other factors as determined by the specific configuration and/or location of living vertical garden assembly 100.

While a single living vertical garden assembly 100 may be hung from only a single side of support frame 50, as shown in FIG. 2, if support frame 50 is a generally freestanding structure, a second living vertical garden assembly 100 may be hung from an opposing side of support frame 50.

Figure 10:
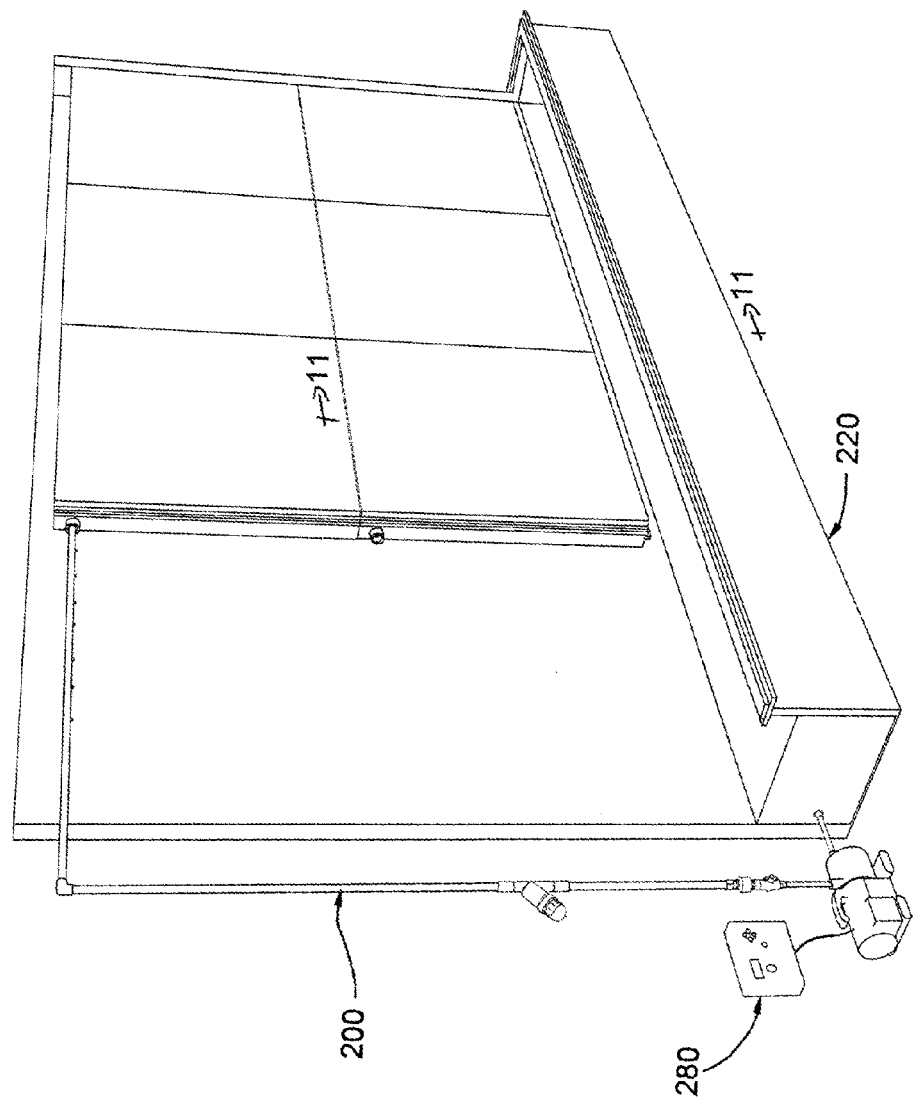
FIG. 10 is a perspective view of a living vertical garden assembly according to a second exemplary embodiment of the present invention.
Figure 11:
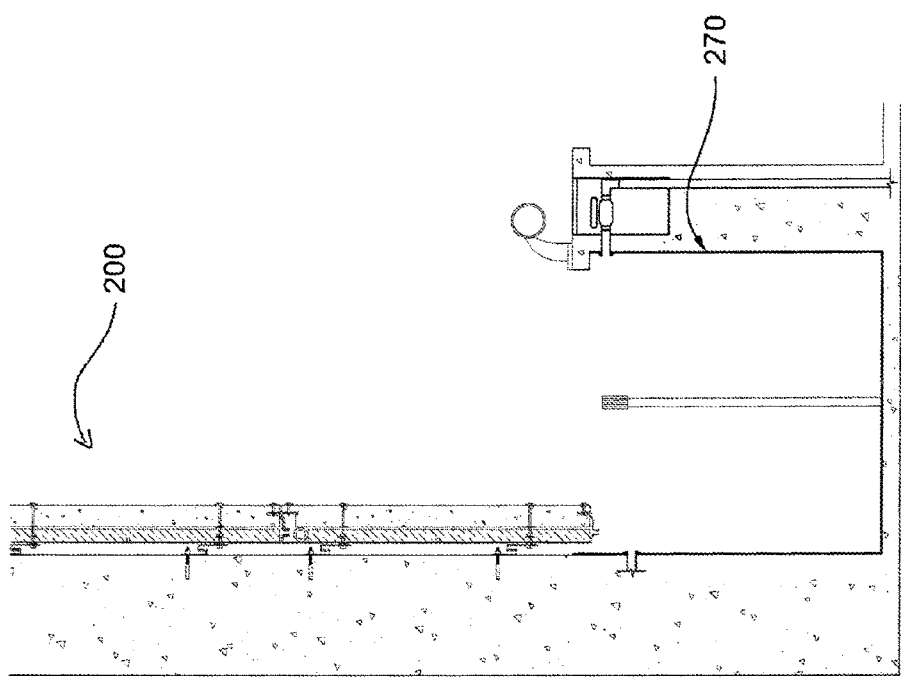
FIG. 11 is a sectional view of the living vertical garden assembly shown in FIG. 10, taken along lines 11-11.

A second embodiment of a living vertical garden assembly 200 in accordance with the present invention is shown in FIGS. 10-11. Living vertical garden assembly 200 is similar to living vertical garden assembly 100 with the exception of, instead of drip channel 160 that directs excess irrigation fluid to a drain, living vertical garden assembly 200 may include a reservoir 270, located at a location physically below the bottom of living vertical garden assembly 200, that allows excess irrigation fluid to drain from the bottom of living vertical garden assembly 200 directly into reservoir 270 such that reservoir 270 receives and stores the excess irrigation fluid. A pressurized water system 280 can use the fluid from reservoir 270 as a fluid source for irrigating living vertical garden assembly 200.

If desired, a nutrient supply, such as described above with respect to living vertical garden assembly 100, can be used in conjunction with pressurized water system 280. Alternatively, nutrients can be added directly to reservoir 270. Reservoir 270 may be large enough to support aquatic life, such as fish. Further, growth medium assembly 130 promotes a filtration process to uptake pollutants and particulates from within reservoir 270, thereby helping to support the aquatic life.

Figure 12:
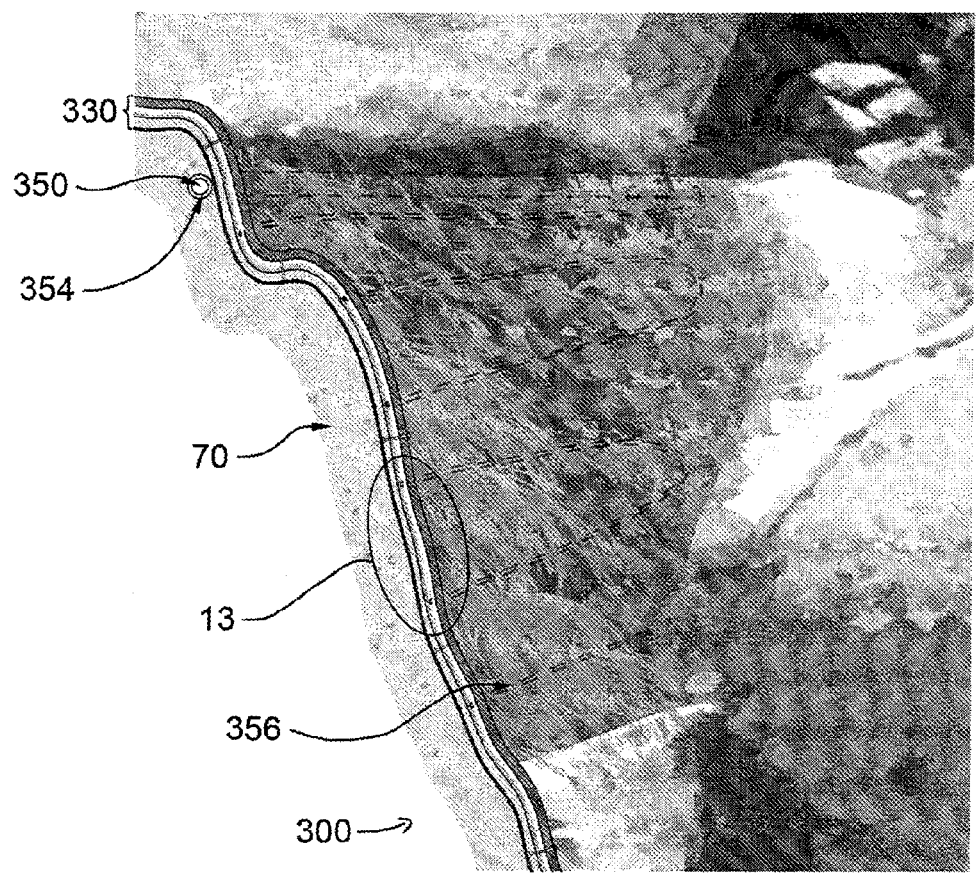
FIG. 12 is a perspective view of a living vertical garden assembly according to a third exemplary embodiment of the present invention.
Figure 13:
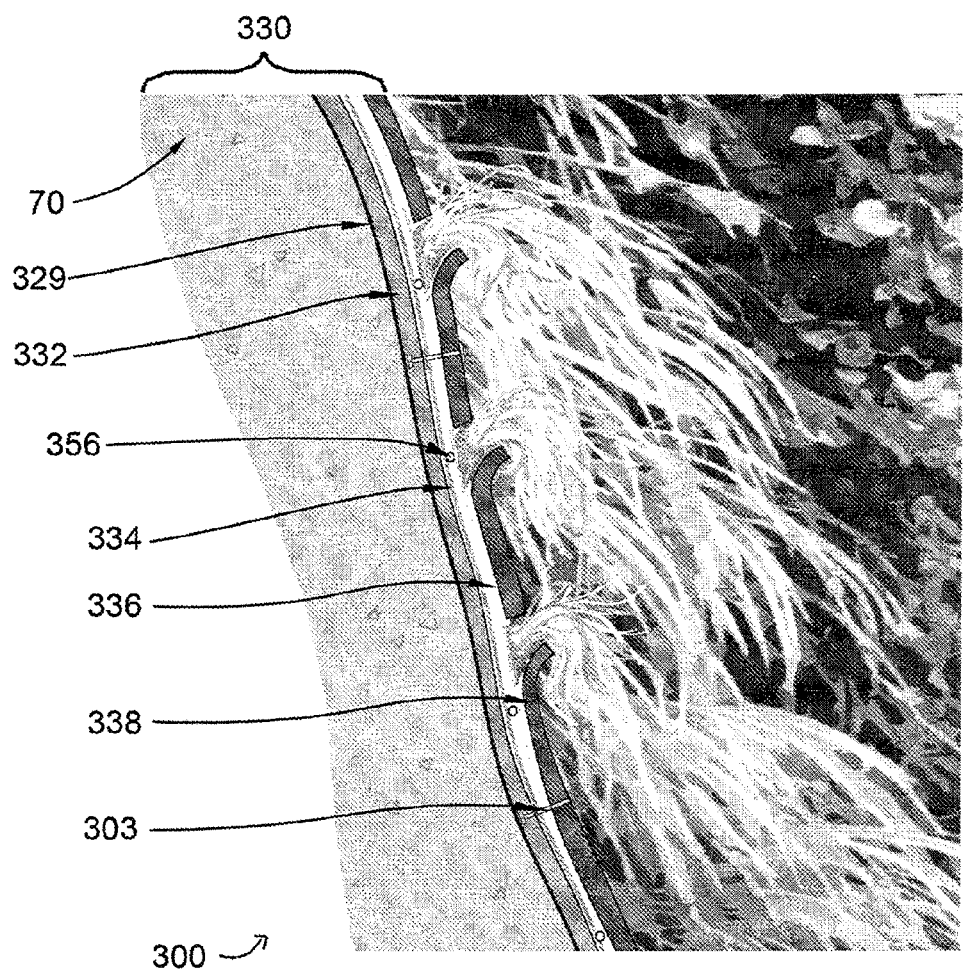
FIG. 13 is an enlarged view of a portion of the living vertical garden assembly shown FIG. 12.

A third embodiment of a living vertical garden assembly 300 in accordance with the present invention is shown in FIGS. 12-13. Living vertical garden assembly 300 may be applied over a rock formation 70 or other similar type surface. With living vertical garden assembly 300, wall panel 102 that is used in living vertical garden assembly 100 and living vertical garden assembly 200 is omitted. Instead, a flexible waterproof barrier 329, such as, for example, bituthene, which is a self-adhesive waterproof elastomer barrier, or other suitable material such as, for example, a waterproof epoxy resin, is laid directly over rock formation 70.

A growth medium assembly 330 is laid over waterproof barrier 329. Growth medium assembly 330 includes a plurality of layers extending, from rear, adjacent to rock formation 70, to front of living vertical garden assembly 300, an inorganic wicking matrix 332, a first nutrient transfer matrix 334, a second nutrient transfer matrix 336, and an inorganic planting matrix 338.

Growth medium assembly 330 may be secured to rock formation 70 by inserting a plurality of threaded inserts 303 through growth medium 330 and waterproof barrier 329 and into rock formation 70. The opening formed in waterproof barrier 329 must be waterproofed in order to prevent irrigation fluid from passing through waterproof barrier 329. This waterproofing may be in the form of O-rings, sealants, or other known waterproofing mechanisms. Plant material is inserted into growth medium assembly 330 in a manner similar to that described above with respect to growth medium assembly 130.

In order to provide water and nutrients to the plant roots, living vertical garden assembly 300 includes an irrigation distribution system 350. Irrigation distribution system 350 includes a vertical supply conduit (not shown) that is in fluid communication with a horizontal irrigation distribution conduit 354. In an exemplary embodiment, horizontal irrigation distribution conduit 354 has a nominal diameter of about 16 mm (about ⅝ inch). Horizontal irrigation distribution conduit 354 is in fluid communication with an irrigation drip tube 356 that is woven throughout growth medium assembly 330. Also, as discussed above with respect to living vertical garden assembly 100 and living vertical garden assembly 200, living vertical garden assembly 300 may include a reservoir (not shown) at the bottom thereof or a drip channel (not shown) that drains to a drain (not shown).

Figure 14:
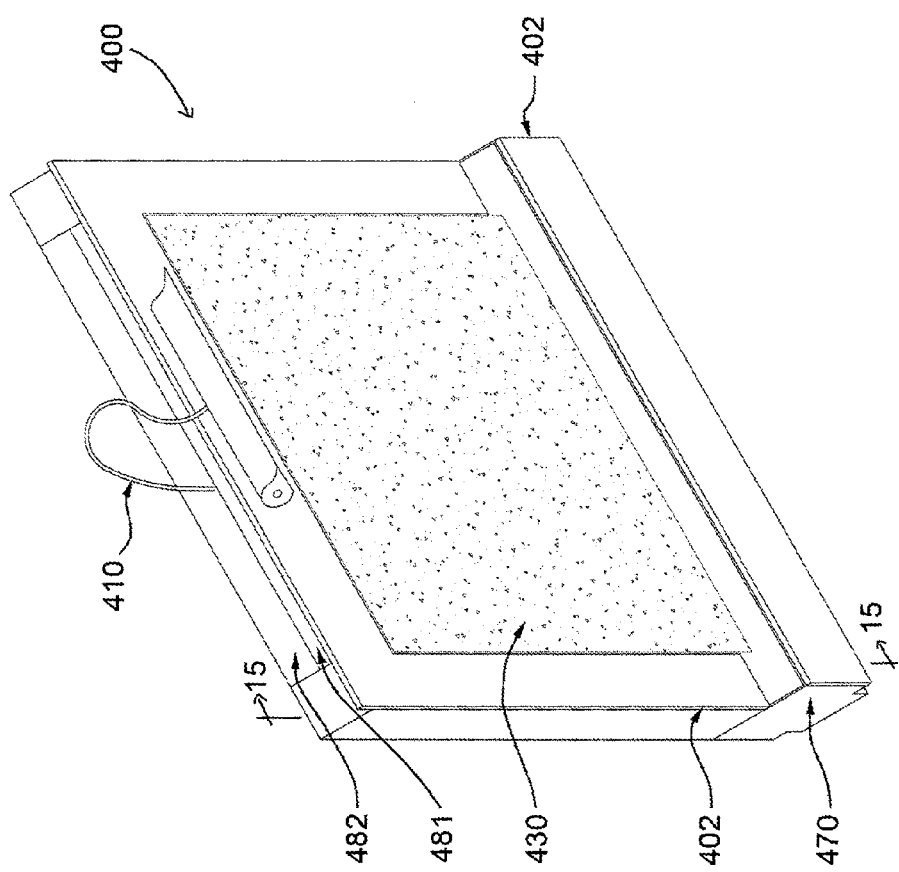
FIG. 14 is a perspective view of a living vertical garden assembly according to a fourth exemplary embodiment of the present invention.
Figure 15:
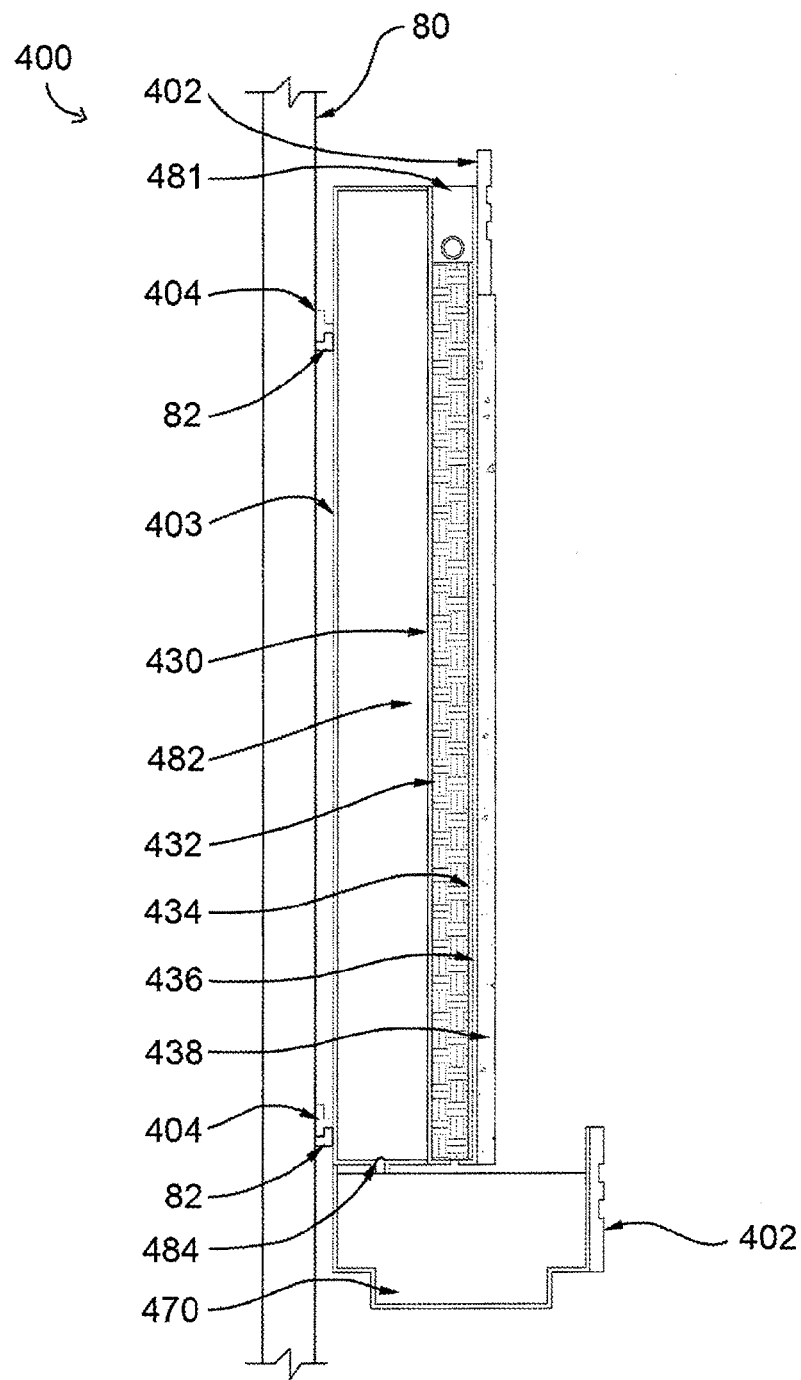
FIG. 15 is a sectional view of the living vertical garden assembly shown in FIG. 14, taken along lines 15-15.
Figure 16:
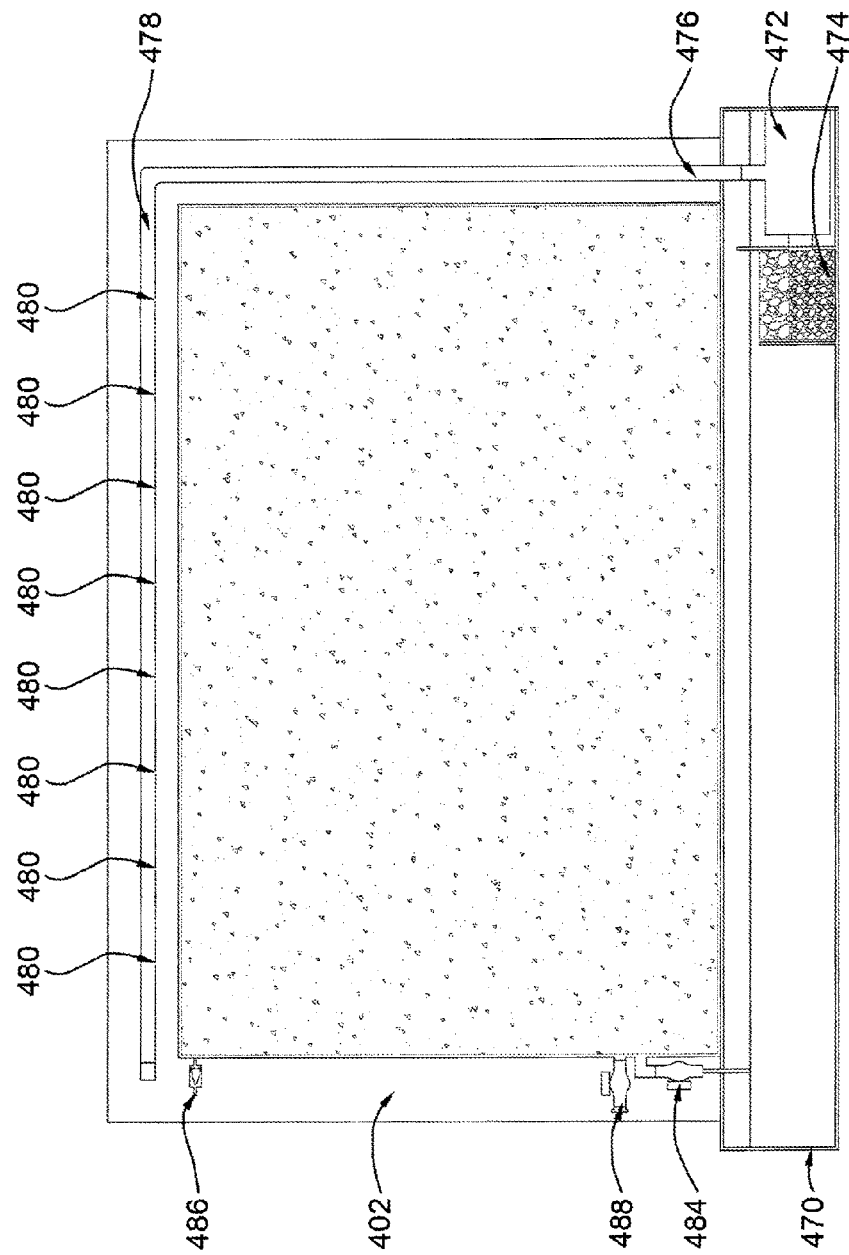
FIG. 16 is a rear elevational view of the living vertical garden assembly shown in FIG. 14.

A fourth embodiment of a living vertical garden assembly 400 in accordance with the present invention is shown in FIGS. 14-16. Living vertical garden assembly 400 may be removably mounted on a vertical surface, such as a wall, such that living vertical garden assembly 400 provides the appearance of a three-dimensional picture. Living vertical garden assembly 400 includes a wall panel 402 that supports living vertical garden assembly 400 and that is used to hang living vertical garden assembly 400 on a wall 80. In an exemplary embodiment, a rear portion 403 of wall panel 402 may include at least one J channel support 404 that may be used to directly engage a corresponding J channel 82 mounted on wall 80. In the exemplary embodiment shown FIG. 15, two J channel supports 404 are provided. While J channels 82 are shown, those skilled in the art will recognize that other methods of supporting living vertical garden assembly 400 on wall 80 may be used.

Living vertical garden assembly 400 is a self-contained unit, with a reservoir 470 and a pressurized water system 480, shown FIG. 16, that uses a fluid from reservoir 470 as a fluid source for irrigating living vertical garden assembly 400. A water pump 472 draws water from reservoir 470 through a filtration system 474. Water pump 472 outputs irrigation water through a vertical fluid supply line 476 to a horizontal irrigation line 478. Horizontal irrigation line 478 include a plurality of openings 480 formed therein through which irrigation fluid flows in order to irrigate plantings in a growth medium assembly 430.

Wall frame 402 supports growth medium assembly 430. In an exemplary embodiment, growth medium assembly 430 may be identical to growth medium assembly 130 described above with respect to living vertical garden assembly 100 and can include an inorganic wicking matrix 432 a first nutrient transfer matrix 434, a second nutrient transfer matrix 436, and inorganic planting matrix 438. Plant material is inserted into growth medium assembly 430 in a manner similar to that described above with respect to growth medium assembly 130.

Living vertical garden assembly 400 includes a water storage tank 482 that is used to replenish reservoir 470 via a replenishment valve 484. A vent valve 486 vent air into water storage tank 482 to make up for water that has flowed from storage tank 482 and into reservoir 470. Optionally, a refill valve 488 may be used to add water into storage tank 482. Alternatively, refill valve 488 may be omitted and water may be added into an opening (not shown) the top of storage tank 482. Wall frame 402 includes an opening 481 at the top thereof that allows access to water storage tank 482.

Water pump 472 may be powered by AC power with an electrical cord (not shown) and may be plugged into a wall outlet, preferably hidden behind living vertical garden assembly 400 so that the electrical cord is not visible during use. Alternatively, water pump 472 may be powered by DC power using batteries (not shown) that are housed within living vertical garden assembly 400 and hidden from view.

Optionally, living vertical garden assembly 400 may also include a lamp assembly 410 that may be used to illuminate plant material planted in living vertical garden assembly 400. Plant assembly 410 may be electrically wired to the power supply that is used to operate the pump 472.

Support equipment, such as water pump 472 and water storage tank 482, is located behind wall frame 402 such that, when living vertical garden assembly 400 is mounted on a wall, wall frame 402 defines a "wall print" such that all support equipment is located within the perimeter of the wall print and is out of view from an observer who is observing living vertical garden assembly 400 from the front.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A modular wall assembly for growing and promoting vegetative growth, the assembly comprising:
   a frame;
   a growth media disposed within the frame, the growth media comprising:
      a wicking matrix;
      a first nutrient transfer matrix adjacent to the wicking matrix;
      a second nutrient transfer matrix adjacent to the first nutrient transfer matrix;
      an open cell foam planting matrix adjacent to the second nutrient transfer matrix; and
   a plurality of vertical fluid conduits extending from the horizontal fluid conduit between the first nutrient transfer matrix and the second nutrient transfer matrix,
   wherein the frame further comprises a top portion, the top portion having a generally horizontal groove formed therein, wherein the top portion further comprises a horizontal fluid conduit extending generally parallel to the horizontal groove.

2. The modular wall assembly according to claim 1, wherein the wicking matrix is constructed from an inorganic material.

3. The modular wall assembly according claim 2, wherein the wicking matrix comprises a polymer based material having a density of between about 15 kg per cubic meter and about 25 kg per cubic meter.

4. The modular wall assembly according claim 2, wherein the wicking matrix comprises a polymer based material having a tensile strength of between about 5 pounds per square inch and about 10 pounds per square inch.

5. The modular wall assembly according to claim 1, wherein the planting matrix is constructed from an inorganic material.

6. The modular wall assembly according to claim 1, wherein the frame further comprises a rear wall and wherein the growth media is releasably attached to the rear wall via a plurality of fasteners extending through the planting matrix.

7. The modular wall assembly according to claim 1, wherein the frame further comprises a sidewall extending downward from the top portion, such that the horizontal fluid conduit extends outward from the frame through the sidewall.

8. The modular wall assembly according to claim 1, wherein the frame further comprises a lip extending at least partially there around, the lip extending into the planting matrix.

9. The modular wall assembly according to claim 1, wherein the first nutrient transfer matrix is a generally planar substrate.

10. The modular wall assembly according to claim 1, wherein the second nutrient transfer matrix is a generally planar substrate.

11. A modular wall assembly for growing and promoting vegetative growth, the assembly comprising:
    a generally parallelepiped frame having a rear wall and a top portion;
    a horizontal fluid conduit extending along the top portion of the frame, the horizontal fluid conduit adapted to be in fluid communication with a pressurized water source;
    a growth media releasably installed in the frame, the growth media comprising, from the rear wall forward:
       an inorganic wicking matrix;
       a first nutrient transfer matrix;
       a second nutrient transfer matrix; and
       an inorganic planting matrix; and
    a plurality of vertical fluid conduits in fluid communication with the horizontal fluid conduit, the plurality of vertical fluid conduit extending between the first nutrient transfer matrix and the second nutrient transfer matrix.

12. The modular wall assembly according to claim 11, wherein the horizontal fluid conduit extends between the rear wall and the inorganic planting matrix.

13. The modular wall assembly according to claim 11, wherein the frame further has a bottom portion, the bottom portion having a drain channel extending generally along the length thereof.

14. The modular wall assembly according to claim 11, wherein at least a portion of the inorganic planting matrix extends outwardly from the frame.

15. A modular wall system comprising:
    a first modular wall assembly comprising a first growing media and a first frame having a top portion, the top portion having a generally horizontal groove formed therein; and
    a second modular wall assembly comprising a second growing media and a second frame having:
       a top portion having a horizontal fluid conduit extending therethrough; and
       a bottom portion having a generally horizontal tongue formed therein, the horizontal tongue adapted to be inserted into the horizontal groove in the first modular wall assembly such that fluid flowing from the horizontal fluid conduit through the second modular wall assembly is directed by the horizontal tongue into the first modular wall assembly.

16. The modular wall system according to claim 15, wherein the second modular wall assembly further comprises a first sidewall extending downward from the top portion, such that the horizontal fluid conduit extends outward from the frame through the first sidewall;
    a third modular wall assembly having a third growing media and a second sidewall, the second sidewall having an opening therein such that, when the third modular wall assembly is coupled to the second modular wall assembly, the horizontal fluid conduit extends into the opening.

17. The modular wall system according claim 16, wherein the first sidewall and the second sidewall prevent a free transfer of water between the second growing media and the third growing media.

* * * * *